Patented Nov. 30, 1926.

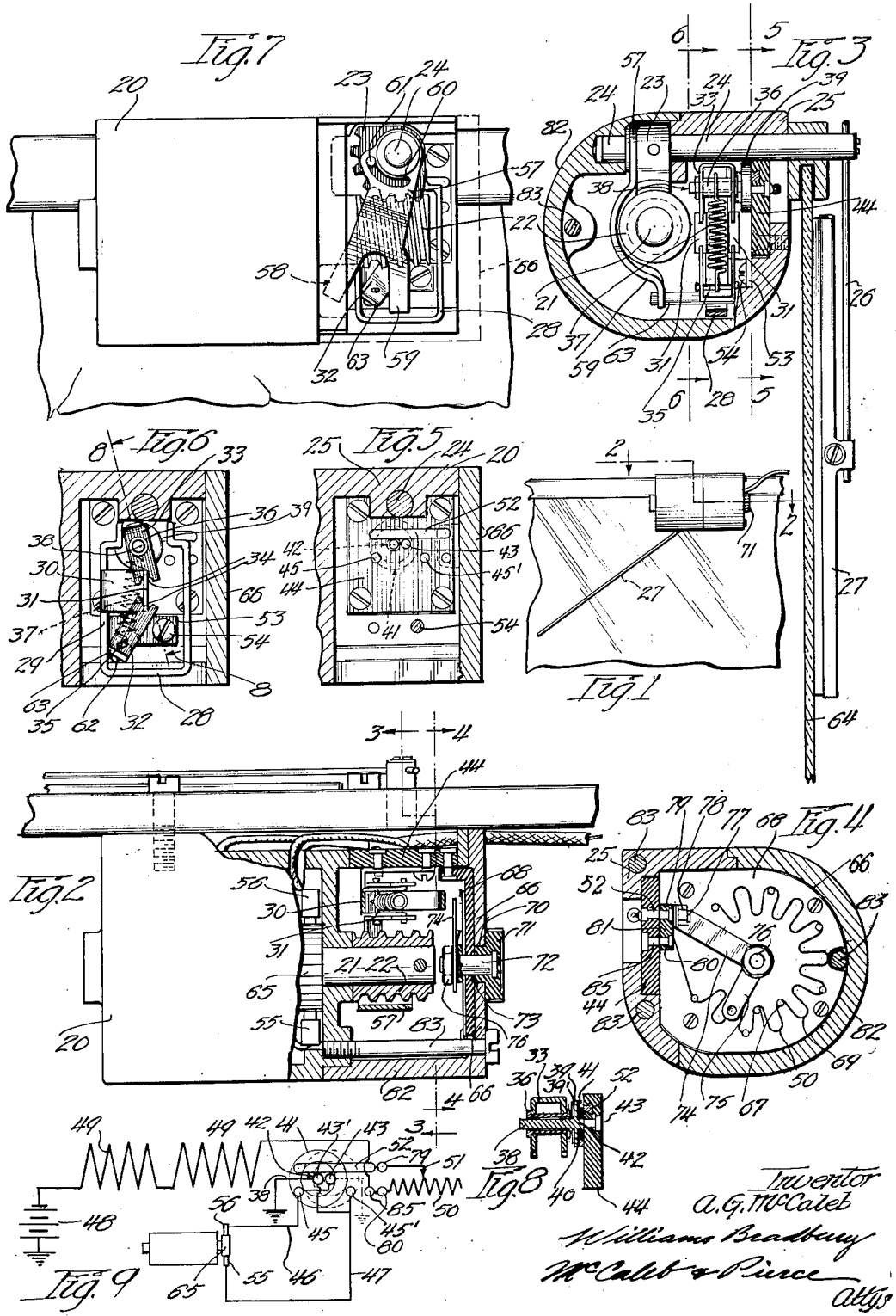

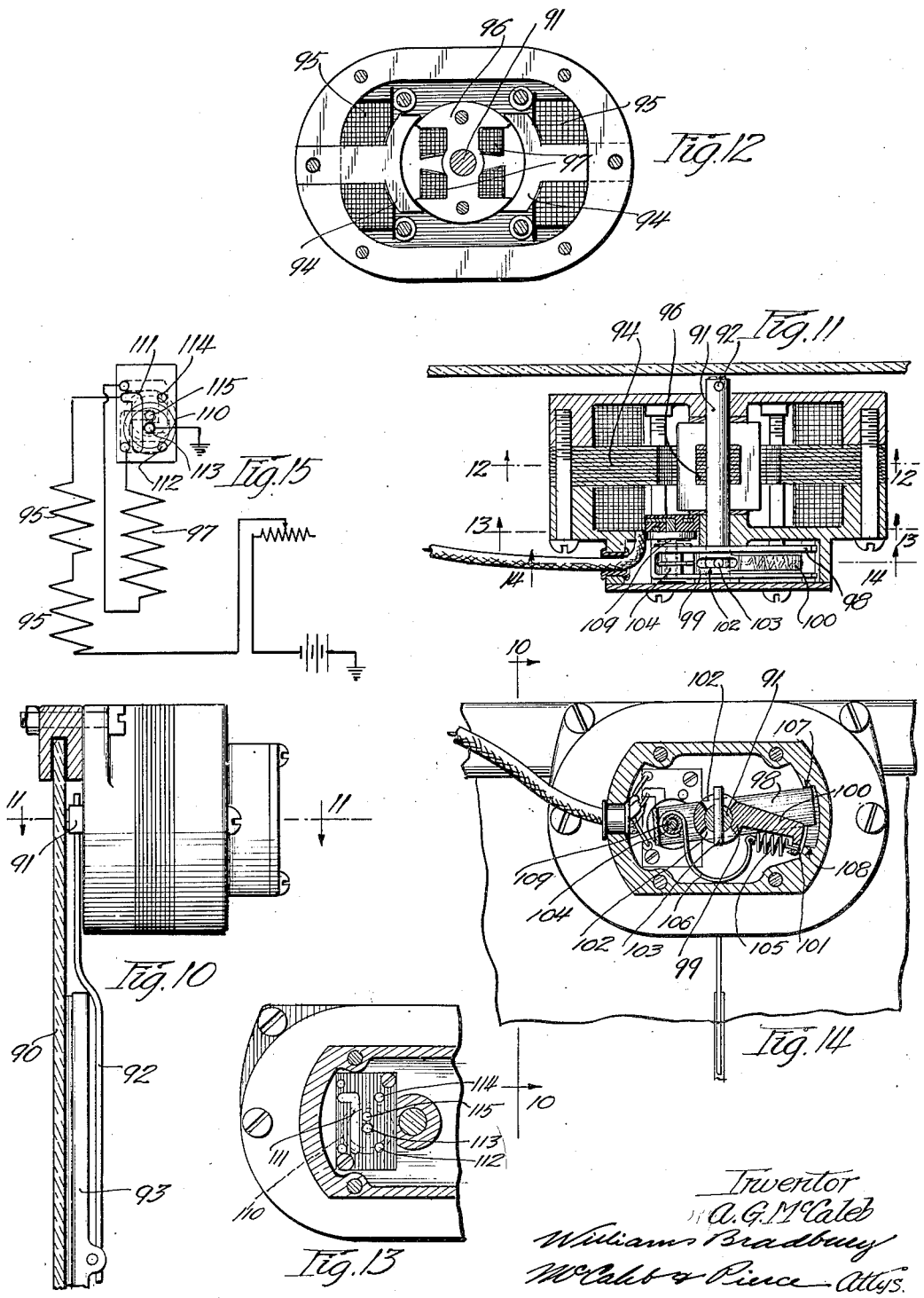

1,608,985

UNITED STATES PATENT OFFICE.

ALBERT G. McCALEB, OF OAK PARK, ILLINOIS, ASSIGNOR, BY MESNE ASSIGNMENTS, TO TRICO PRODUCTS CORPORATION, OF BUFFALO, NEW YORK, A CORPORATION OF NEW YORK.

MOTOR-CONTROL SYSTEM FOR ELECTRICALLY-OPERATED WINDSHIELD CLEANERS.

Application filed February 9, 1922. Serial No. 535,269.

This invention relates to windshield cleaners and particularly to electrically operated cleaners of the continuously oscillating type.

The object of the present invention is to provide a cleaner of this kind, which will be compact in structure, efficient in operation, and consist of few parts of simple construction.

One of the features of the invention is the provision of an operating motor for a windshield cleaner, and means for reversing the current therethrough at proper intervals.

Another feature of the invention is the arrangement which permits a circuit shifting device to be mounted within a very small space.

Other features and advantages will appear from time to time as the description of the invention progresses.

In the drawings which illustrate certain embodiments of applicant's invention,

Figure 1 is a view showing a portion of an automobile windshield with the cleaner attached thereto;

Figure 2 is a section substantially on the line 2—2 of Figure 1, looking in the direction of the arrows;

Figure 3 is a section on the line 3—3 of Figure 2, looking in the direction of the arrows;

Figure 4 is a section on the line 4—4 of Figure 2;

Figure 5 is a section on the line 5—5 of Figure 3;

Figure 6 is a section on the line 6—6 of Figure 3;

Figure 7 is a side view of the device with portion of the housing removed;

Figure 8 is a section on the line 8—8 of Figure 6;

Figure 9 is a diagram schematically indicating the operating circuit for the embodiment of the invention shown in Figures 1 to 8;

Figure 10 is a side elevation of a modified form of applicant's invention, showing the manner in which it is attached to an automobile windshield;

Figure 11 is a view substantially on the line 11—11 of Figure 10;

Figure 12 is a section on the line 12—12 of Figure 11;

Figure 13 is a section on the line 13—13 of Figure 11;

Figure 14 is a section on the line 14—14 of Figure 11; and

Figure 15 is a diagram schematically indicating the circuit and controlling device therefor used in the embodiment of the invention shown in Figures 10 to 14.

Referring now to the drawings in which like reference characters indicate corresponding parts in the several views, 20 indicates a motor which may be of any preferred design. The present invention, however, contemplates a motor which is provided with field windings, and rotary windings to which current is supplied through a commutator. As motors of this character are old and well-known the details thereof are not shown in the present disclosure.

To the motor shaft 21 is secured the worm 22. The worm 22 is arranged to mesh with the gear sector 23, fixed to the shaft 24, suitably journaled in the cleaner housing 25. To the outer end of the shaft 24 is secured the cleaner arm 26, which is provided at the free end thereof with the windshield engaging member or squeegee 27. Thus, it will be seen that rotary movement of the motor shaft 21 is transmitted through the worm 22, gear sector 23, shaft 24 and arm 26, to the squeegee 27.

In cleaners of this type, it is customary to oscillate the cleaner arm back and forth through an arc of substantially 100°. Applicant is enabled to accomplish this operation by the provision of means which at an appropriate stage in the movement of the cleaner arm operates to reverse the current flow through the rotating windings of the motor 20. This current reversing means consists of a snap switch and operating means therefor which will now be described. At 28 is shown a substantially U-shaped metallic strip, which forms the framework or support for the movable switching elements of the circuit controlling device. The leg 29 of the supporting member 28 is provided with inwardly extending spaced flanges 30, each of which terminates in a right-angularly outwardly extending portion 31. Arranged to engage the opposite edges of the portions 31 are a pair of substantially U-shaped metallic members 32 and 33, each of which is provided in each of its free ends with a notch 34 arranged to engage and cooperate with similar notches in the edges of the portions 31. Thus, the U-shaped members 32 and 33 are pivoted at their free ends on the edges of the portions 31, as clearly indicated in Figures 3 and 6. Extending across the U-shaped member 32 is a pin 35, and extending across the U-shaped member 33 is a sleeve 36. A tension spring 37 is joined at one end to the pin 35, and at its other end to the sleeve 36. Thus, whenever one of the U-shaped members, as 32, is moved past the center as to the right in Figure 6, the other member 33 will immediately be snapped to its extreme right hand position by the tension of the spring 37. The movement of the U-shaped members 32 and 33 is limited by the portions of the frame 28 with which they engage.

Extending loosely through the sleeve 36 is a pin 38 provided with the flange 39, to which is secured the insulating washer 40. Mounted in the insulating washer 40 in any desired manner is a ring 41, of conducting material. Ring 41 is arranged to have its lateral surface lie flush or slightly above the surface of the insulating washer 39. Ring 41, as will presently appear, forms one of the movable contacts of the switching device. The portion 42 of pin 38 which extends through the insulating washer 40 forms the other movable terminal of the switching device. It may be here explained that the pin 38 and the contact 42 are grounded by being connected to the cleaner housing through the associated parts.

The fixed contacts of the switching device are four in number, and each is in the nature of a pin 43 (see Figure 8) fixed in the insulating block 44. The contact members, as 43, are arranged to have their faces adjacent to the movable portion of the switching device lie flush with or slightly above the corresponding surface of the insulating block 44. The conductors leading to the terminals of the motor are joined to the contacts, as 43.

Referring now to Figure 9, two contacts 43 and 43' are shown, which are adapted to be engaged by the contact 42, and two contacts 45 and 45' are shown, which are arranged to be engaged by the contact ring 41. It will be noted that contacts 43 and 45 are both connected to the conductor 46, joined to one of the commutator brushes of the motor, and the contacts 43' and 45' are connected to a conductor 47 extending to the other commutator brush of the motor. A source of electrical energy, as the ordinary storage battery of the automobile, is indicated at 48. The live or ungrounded pole of the battery is connected through the field windings 49 of the motor to the resistance of a rheostat generally indicated at 50, (shown in detail in Figure 4). The movable contact 51 of the rheostat is connected to the bus bar 52, also mounted in the insulating block 44 (Figure 8). The bus bar 52 is arranged with its left edge as seen in Figure 8, substantially flush with or very slightly above the surface of block 44. The frame member 28 is provided with an ear 53, which is secured to the housing of the cleaner by a screw or screws 54, as shown in Figures 3 and 6. Thus mounted, the contact 42 and conducting ring 41 are brought into engagement with the surface of the insulating block 44, under pressure of a light spring 39'.

Referring now again to Figure 9, it will be noted that the ring 41 in the position shown in solid line overlies the bus bar 52, and contact 45, while the conducting element 42 overlies and engages the contact 43'. As the contact 42 is grounded through the frame of the device, the lower commutator brush 55 is connected to the grounded pole of the battery, while the upper commutator brush 56 is connected through contact 45, ring 41 and bus bar 52, to the live side of battery.

When, however, the movable members of the circuit changing device are moved to the right in Figure 9, into the dotted line position by means to be presently described, the ring 41 joins the bus bar 52 to contact 45' while the grounded contact 42 is now in engagement with contact 43. It will thus be seen that the connection of the commutator brushes to the battery has been reversed as the upper commutator brush is now grounded, and the lower brush 55 is connected to the non-grounded pole of the battery.

As above briefly set forth, whenever the member 32 is moved to a position past center with respect to the line joining the pin 32 to the sleeve 36, the switching elements 32 and 33 will be immediately snapped to their extreme alternate position by means of the tension spring 37. The means for causing this operation of the switching elements 32 and 33 at appropriate intervals will now be described. Loosely mounted on the shaft 24, is the arm 57, which terminates at its lower end in the separated portions 58 and 59. The arm 57 is provided concentrically with the shaft 24 with arcuate slot 60, into which projects a pin 61 carried by the sector 23. Thus, it will be noted that there is means for providing lost motion between the sector 23 and the arm 57, i. e., the sector 23 must rotate a distance approximately equal to the length of the slot 60, before pin 61 will engage the opposite end of the slot. The purpose for this will presently appear.

Secured to the base portion of the U-shaped member 32, as by a screw 62, is a finger 63. Finger 63 projects between the portions 58 and 59 of the arm 57. Thus, upon rotation of the arm 57 about the axis of the shaft 24, one or the other of the portions 58 or 59 will ultimately engage the finger 63, and cause the member 32 to rotate in the same direction. Now assuming that the parts are in the position indicated in Figure 7, and that the cleaner arm 26 is in its extreme left hand position, and further assuming that the motor is so connected to the battery 48 as to cause the motor shaft 21 to rotate in a clockwise direction, as viewed from the right in Figure 7, it will be understood that the sector 23 and shaft 24 will be rotated to cause the arm 26 to move to the right and cause the squeegee 27 to pass over the windshield. After the sector 23 has moved a distance sufficient to bring the pin 61 into engagement with the right end of the slot 60, arm 57 will be rotated in a counter-clockwise direction, as seen in Figure 7, and arm 58 will be brought into engagement with the finger 63 projecting from the switch actuating member 32, and in the course of its further movement will cause the member 32 to pass center with respect to the member 33. At this time, the spring 37 will operate to snap the movable contact members 41 and 42 into their alternate position, thus reversing the connection of the battery terminals to the movable windings of the motor, as above explained, and causing the motor to be driven in the opposite direction, when the reverse of the process just described will take place.

It is to be understood that the slot 60, bifurcations 58 and 59, and the movable elements 32 and 33 are so arranged and constructed that the switch will operate to reverse the battery connections at the appropriate time as the windshield cleaner arm approaches a horizontal position. Preferably, the windshield cleaner arm will have a movement over an arc of substantially 100°.

The friction of the squeegee 27 on the surface of the windshield 64 will operate as a brake and tend to prevent excessive speed of rotation of the motor. It will also operate to practically instantaneously stop rotation of the motor upon reversal of the battery connections.

While in the drawing, the motor is not shown in detail, it is to be understood that the brushes 55 and 56 operate through the commutator 65 to supply current to the usual or any preferred type of movable motor coils.

The manner of mounting, and the connections for, the rheostat shown in Figure 4 will now be described. The rheostat is carried on the end plate 66 and consists of a series of contacts 67 mounted on the insulating plate 68, and the sections 69 of resistance between the successive contacts 67. Pivotally supported within the opening 70 in the end plate 66 is a thumb piece or handle 71, of insulating material, from which pivot lug 72 projects through an opening 73 in the insulating block 68. Pivot lug 72 projects through an opening in the conducting strip 74, and has the contact engaging arm 75 rigidly secured thereto at the outer end by means of the nut 76. The conducting arm 74 is joined to a binding post 77 by means of a nut 78. Binding post 77 terminates at its left end as seen in Figure 4 in a contact 79, the purpose of which will presently appear. The resistance sections 69 are connected to the contact 80. Contacts 79 and 80 are arranged to lie substantially flush with the face of the insulating block 81. The end plate 66 is provided with a housing flange 82 (Figures 2, 3 and 4), which is arranged to cover the portion of the device shown in detail in Figure 7. This flange 82, however, does not extend entirely around the plate 66, as the mounting plate for the movable switch forms a side of the housing on the side toward the windshield and on a portion of the upper side. The rheostat carrying member may be considered as having substantially the form of a can which has one end and about a third of its cylindrical surface cut away. The rheostat plate and housing flange carried thereby are adapted to be secured in position by means of the screws or bolts 83, which pass through the end plate 66, and have a screw threaded engagement with the motor frame. When the plate 66 and flange 82 are clamped in position, the contacts 79 and 80 are arranged to engage respectively bus bar 52 and contact 85 mounted in the portion of the housing secured to the motor frame, contact 85 being connected to the end of the field winding 49 which is remote from the battery 48. Thus, the rheostat 50 may be readily removed from or replaced upon the cleaner for purposes of adjustment or repair, without changing any of the electrical connections, and when the rheostat is placed in position, the connections between the battery and bus bar 52 are automatically made by contacts 79 and 80.

Referring now to the modification shown in Figures 10 to 15 of the drawings, 90 indicates the windshield, to the outside of which is secured in any desired or suitable manner the windshield cleaner operating device, as shown in Figure 10. This device consists essentially of a motor, to the shaft 91 of which is rigidly secured the windshield operating arm 92, at the lower end of which is supported, in any desired manner, the squeegee 93. Referring to Figure 12, the field pole pieces are shown at 94. Associated with each of the pole pieces 94 is a field winding 95. Rotatably supported in the housing is the shaft 91, previously referred to, upon which is mounted the armature structure 96, provided with the coils 97. As the shaft 91 of this modification is arranged to rotate through only a fraction of a revolution, the leading in wires for the coils 97 may be in the nature merely of flexible conductors. It will be understood that when current is supplied to the coils 97 in one direction, there will be a tendency to rotate the shaft 91 in a corresponding direction, but when the flow of current through the coils 97 is reversed, there will be a tendency to rotate the shaft 91 in the reverse direction. As the cleaner arm 92 is rigidly connected to the shaft 91, whenever the shaft is rotated by means of the motor mechanism, the squeegee 93 will be caused to pass over the surface of the windshield 90. Means are provided whereby the flow of current through the coils 97 is automatically reversed when the shaft 91 is rotated through an arc of substantially 100°, thus causing an oscillating rotation of the shaft.

The current reversing means shown in the present embodiment is somewhat similar to that previously described in connection with the embodiment of the invention shown in Figures 1 to 9, and comprises an elongated substantially U-shaped element 98, which is pivotally supported intermediate its ends on the shaft 91. Also rotatably supported on the shaft 91 is the collar 99, provided with the arm 100, which terminates at one side in the perforated lug 101. The collar 99 is provided on its opposite sides with the slots 102, through which projects the pin 103, carried by shaft 91. Extending across the side pieces of the U-shaped member 98, adjacent to the closed end thereof, is a sleeve 104. Tension spring 105 has one end secured to the perforated lug 101, and the other end to the substantially semi-circular rod 106. The end of rod 106 remote from spring 105 encircles the sleeve 104. It will be seen that whenever the arm 100 is rotated so that the lug 101 passes across the line passing through the axes of sleeve 104 and shaft 91, spring 105 will cause the U-shaped member 98 to snap to its alternate position. It may here be noted that the rotary movement of the member 98 about shaft 91 is limited in one direction by the abutment 107, and in the other direction by abutment 108. Thus, assuming that the outer end of arm 100 is moved upwardly as seen in Figure 14, since lug 101 crosses the line passing through the axes of collar 104, and shaft 91 the left end of member 98 will be moved upwardly and the right end moved downwardly into engagement with abutment 108. Extending through the sleeve 104, is a pin 109, which may be essentially the same in all respects as pin 38 of Figure 8. Pin 109 of the present modification will be provided with contact elements corresponding in every way with the contact elements 41 and 42, of Figure 8, and the movement of the contact elements in the modification shown in Figures 10 to 15 will be essentially the same in all respects as the movement of the contact elements of the embodiment shown in Figures 1 to 9. The description of this portion of the structure therefore will not be repeated.

Referring now to Figure 15, it will be noted that when the contact ring 110 is in its full line position, it will join bus bar 111 to contact 112, thus connecting the live pole of the battery to the upper end of the windings 97, as seen in Figure 15. At this time, the opposite terminal of the winding 97 will be connected to ground through contact 113, and pin 109 in a manner which will now be well understood. When, however, the ring is moved to the position indicated in dotted lines in Figure 15, the lower terminal of coil 97 will be connected to bus bar 111 through contact 114 and the upper terminal of the coil 97 will at this time be grounded by reason of pin 109 being in engagement with contact 115. It will thus be seen that whenever the contact elements, pin 109 and ring 110, are moved to their alternate positions, the connections of battery to the motor coils is reversed. In this embodiment of the invention, the motor shaft will be rotated through an arc of about 100° and the battery reversing switch will operate at the end of this rotation to reverse the flow of current, thus causing the shaft to oscillate back and forth.

To vary the speed of oscillation of the cleaner, a rheostat 116 may be interposed between the field windings 95 and the battery, as shown in Figure 15. As this modified form of cleaner is mounted on the outside of the windshield, I prefer to place the rheostat 116 on the instrument board or other suitable part of the automobile.

It will be noted that in each of applicant's forms of the invention, there is a lost motion between the driving member and contact actuating arm. In the device illustrated in Figure 7 it is the engagement of pin 61 within the slot 60, while in the form illustrated in Figure 14 it is the engagement of pin 113 in the slots 102. By providing this lost motion, applicant is enabled to arrange his contact operating mechanism within much less space than would be possible were this lost motion connection not provided. Furthermore, he is enabled to secure an actuation of the reversing contacts by a very limited travel of the actuating means, which would not be possible without the use of this lost motion connection.

While in the herein disclosed embodiments of applicant's invention, certain specific details have been adhered to, it is to be understood that many modifications of the device are contemplated and the invention is therefore to be limited merely by the scope of the appended claims.

What I claim as new and desire to secure by Letters Patent of the United States is:

1. In a motor control mechanism for windshield cleaners, the combination of a motor having windings, an oscillatory shaft driven by said motor, a source of electrical energy, means connecting said source to said windings, means actuated by said oscillatory shaft for reversing said connections to said windings comprising a contactor element having central and annular contacts and a snap mechanism associated with said contactor element.

2. In combination, an electric motor, windings for said motor, a shaft arranged to be rotated by current through said windings, an arm, means connecting said arm to said shaft, a source of electrical energy, means connecting said source to said windings, and means associated with said shaft for automatically reversing the connections of said source to said windings incident to a predetermined degree of oscillation of said shaft comprising a contactor element having central and annular contacts and a snap-over mechanism for actuating said contactor element.

3. In combination, an electric motor, windings for said motor, an oscillating element adapted to be driven from said electric motor, a source of electrical energy, means connecting said source to said windings, and means for reversing the connections of said source to said windings comprising a contactor having a center electrode, an annular electrode positioned around said center electrode and insulated therefrom and a snap mechanism for actuating said contactor element, said snap mechanism being actuated by means carried by said oscillating element and responsive to a predetermined degree of oscillation of said element.

4. In combination, a motor and a shaft oscillated thereby, snap switch mechanism operable by said shaft for effecting a reversal in the operation of the motor, a rheostat connected in circuit with the motor, a housing member supporting the rheostat and cooperating with the motor to form an enclosure for said rheostat and said switch mechanism, means attaching the housing member to said motor, and a control adjusting member mounted on the exterior of said housing member for adjusting said rheostat to control the operation of said motor and said shaft.

5. In a windshield cleaner operating unit, a motor, a shaft oscillated thereby, a snap switch mechanism for reversing the operation of the motor, a finger extending from said switch mechanism, a pivoted actuating arm having parts straddling said finger for alternately engaging and moving the same to effect operation of said switch mechanism, and an operative play connection between said actuating arm and said shaft for oscillating the arm.

6. In a windshield cleaner operating unit, a motor, an oscillatable shaft, a worm driven by the motor, a gear sector fixed on the shaft and meshing with the worm, a snap switch mechanism, an actuating arm pivoted on said shaft and having a part engageable with a part of said switch mechanism for actuating the same, and a play connection between said arm and said gear sector.

7. In a windshield cleaner operating unit, a motor having a frame part, a shaft operated by the motor, a removable housing member cooperating with said frame part to form a chamber, said frame part having a contact electrically connected to the motor, and said housing member having a contact adapted to be brought into electrical contact with the contact on said frame part for establishing an electric circuit therethrough on positioning said member, a rheostat carried by said housing member and connected to the contact on said housing member, and a control handle arranged exteriorly on the housing member for operating the rheostat to effect control of the motor and its operated shaft, said control handle being the sole means of manually controlling the operation of said motor.

In witness whereof, I hereunto subscribe my name this 30th day of January, 1922.

ALBERT G. McCALEB.